(No Model.)

C. E. BROMWELL.
CAR STARTER.

No. 371,545.   Patented Oct. 18, 1887.

Attest
F. A. Hopkins
Edward Stew.

Inventor
Charles E. Bromwell
by Knight Bros. Atty's.

UNITED STATES PATENT OFFICE.

CHARLES E. BROMWELL, OF HELENA, ARKANSAS.

CAR-STARTER.

SPECIFICATION forming part of Letters Patent No. 371,545, dated October 18, 1887.

Application filed September 1, 1886. Serial No. 212,389. (No model.)

*To all whom it may concern:*

Be it known that I, CHARLES E. BROMWELL, of Helena, Phillips county, Arkansas, have invented a new and useful Improvement in Car-Handlers, of which the following is a specification.

Figure 1:
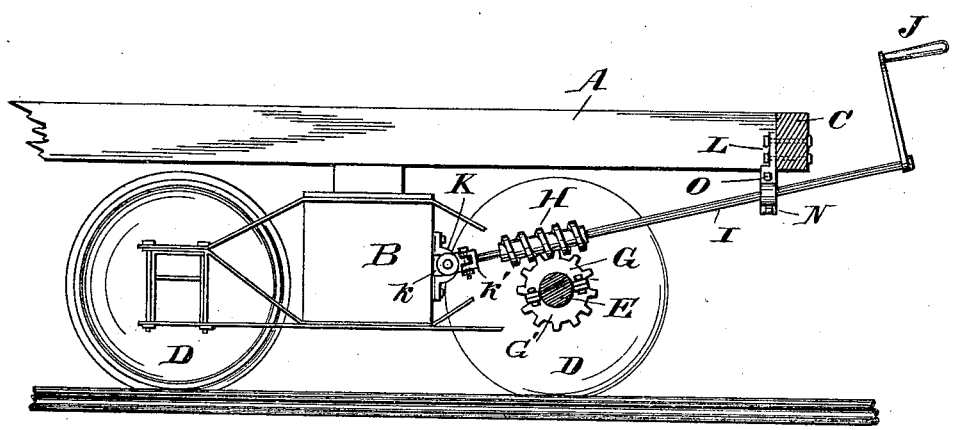
Figure 2:
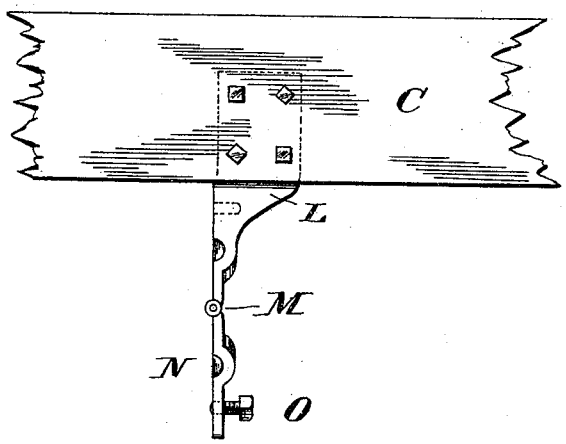

In the accompanying drawings, Figure 1 is a partly-sectioned side elevation of a portion of a car or car-truck provided with my starting device. Fig. 2 is an end view of the outer bearing of the worm shaft.

A is the bed-frame. B is the bolster. C is a head-block. D are track-wheels, and E is a track-wheel axle, of any tram-car or railway-car, or car-truck.

Fixed to the axle E by bolts F are the two halves G G' of a diametrically-divided worm-wheel G' G. Meshing in the wheel G' G is a worm, H, upon a shaft, I, which is journaled in the represented oblique position, so as to bring in convenient position for the operator standing on the ground a crank or handle, J, upon the outer extremity of said shaft. The inner end of the shaft I occupies a journal-bearing, K, which, by means of hinges k k' or otherwise, is capable of being rocked or vibrated in any direction. The other bearing of the worm-shaft I has one part, L, made fast to the under side of the head-block C, and has hinged to it, at M, the other half, N, whose upper portion is capable of being secured to the part L by a bolt, O, or other suitable fastening.

The car having been moved to the desired place by operating the device, as above set forth, fastening O is quickly withdrawn and the shaft I swung laterally out of mesh with the wheel G' G and unshipped. Such shift and removal of the worm-shaft is greatly facilitated by the peculiar construction of the rocker box or bearing K of the inner end of the worm-shaft.

I claim as new and of my invention—

The combination, with axle A, worm-wheel G' G, and worm H, of the worm-shaft I, whose inner end is journaled in a vibrating box, K, on the truck-bolster B, and whose outer end is journaled in the hinged and separable bearing L M N O upon the head-block C, as and for the purposes set forth.

In testimony of which invention I hereunto set my hand.

CHARLES E. BROMWELL.

Witnesses:
A. C. HANLY,
EDGAR ANCKER.